United States Patent [19]
Harris et al.

[11] Patent Number: 6,017,972
[45] Date of Patent: Jan. 25, 2000

[54] CONTROLLED COLOR LASER MARKING OF PLASTICS

[75] Inventors: Ronald M. Harris, Alpharetta; Ke Feng, Lilburn; Alan R. Burgess, Roswell, all of Ga.

[73] Assignee: M.A. HannaColor, Suwanee, Ga.

[21] Appl. No.: 09/322,589

[22] Filed: May 28, 1999

Related U.S. Application Data

[62] Division of application No. 08/874,401, Jun. 13, 1997.
[51] Int. Cl.$^7$ ..................................................... C08K 3/34
[52] U.S. Cl. .................................. 522/2; 521/91; 524/449; 524/583; 524/584; 524/585; 524/586; 524/587; 524/495; 219/121.69
[58] Field of Search ................................. 522/2; 521/91; 524/449, 583, 584, 585, 586, 587; 219/121.69

[56] References Cited

U.S. PATENT DOCUMENTS 4,654,290  3/1987  Spanjer .
5,840,791  11/1998  Magerstedt et al. .

*Primary Examiner*—Andrew E. C. Merriam
*Attorney, Agent, or Firm*—Jones, Day, Reavis & Pogue

[57] ABSTRACT

The invention provides a composition and method for obtaining both light and dark laser marks of varying shades and intensities on a single plastic article by selectively controlling laser parameters. The invention further provides compositions and methods for obtaining pre-selected one-color and multi-colored designs on plastic articles, by selectively controlling material formulations and laser parameter settings.

6 Claims, 4 Drawing Sheets

CONTROLLED COLOR LASER MARKING OF PLASTICS

This application is a divisional of U.S. patent application Ser. No. 08/874,401, filed on Jun. 13, 1997, now allowed.

BACKGROUND OF THE INVENTION

The invention relates to control of laser parameters and material formulations to produce both light and dark laser markings and preselected one-color and multi-colored laser designs on plastic articles.

Laser marking is a well known and important means for quickly and cleanly inscribing plastic surfaces with identification marks, such as date codes, batch codes, bar codes or part numbers, functional marks, such as computer keyboard characters, and decorative marks, such as company logos. The most common laser marks are either a dark mark on a lighter colored background or a light mark on a dark colored background. However, colored laser marks on plastic articles, such as electronic components, exterior automotive parts, or utensils, and the like, are also desirable in order to eliminate the cost and environmental complications associated with inks, masks, and other printing or hot-stamping methods now employed for color imprinting.

The most common mechanism of laser marking of thermoplastic materials depends on the rapid production of heat in the irradiated portion of the plastic due to the absorption of the laser energy. Although some thermoplastics, such as polyethylene, polypropylene (PPRO) and polystyrene, are transparent to laser energy at certain wavelengths, they may be marked by including in the resin composition a laser energy-absorbing additive, such as carbon black, graphite, kaolin, mica, and the like, that increases the rate of temperature rise in the localized portion of the polymer exposed to the laser. Other polymers, such as polyvinylchloride, polyethylene terephthalate and acrylonitrile butadiene styrene (ABS) readily absorb laser energy and require little or no special additives.

A light, dark or colored laser mark on a thermoplastic material may be produced by several different mechanisms or combination of mechanisms, depending on the resin and additives employed, the nature of any colored pigments, and the laser energy characteristics. For example, using a pulsed TEA-$CO_2$ (Transversal Excited Atmospheric Pressure carbon dioxide) laser, a dark marking on polyethylene containing an energy absorbing pigment (Afflair® Lustre Pigment, EM Industries, Hawthorne, N.Y.) can be produced at a relatively low energy level (3 joules/cm$^2$) by heat-induced carbonization of the polymer and/or the pigment at the polymer matrix. A continuous wave (CW)-$CO_2$ laser, however, does not produce sufficient energy to cause carbonization and the plastic melts without leaving a contrast mark. Polymers that have no or a low tendency to carbonize, such as polyolefins and high density polyethylene (HDPE), may show a light mark caused by foaming of the resin due to the heat produced by the laser energy, whereas other polymers, such as polycarbonate (PC), ABS and polystyrene, have a tendency to carbonize rather than foam. A light or a colored mark on a dark background may also be produced when a dark colored additive, such as carbon black or a dark color pigment, is combined with a resin and exposure to the laser results in vaporization or bleaching of the additive and exposure of an underlying heat-stable color pigment or dye or natural polymer color. A dark marking has also been achieved by the use of additives that are colorless in the visible light spectrum but which change into a visible dark or black product when irradiated by laser light just outside the visible range, such as by a Nd:YAG (Neodymium doped Yttrium Aluminum Garnet) laser (wavelength 1064 nm) or an excimer laser (wavelength 308 nm or 351 nm).

It has been desirable in the past to produce a laser mark with the highest visual contrast between the mark and the color of the surrounding plastic. Thus, the lightest (e.g. whitest) or darkest (e.g. blackest) marks or the highest contrast color marks have been those most strived for. High contrast dark marks have been achieved by a TEA-$CO_2$ laser on laser markable thermosetting resins, such as an epoxy, phenol or bismaleimide resin, an unsaturated polyester resin or a urethane resin, by physically coupling a colorant that darkens at a temperature greater than 250° C. to a laser energy absorbing additive, such as cordierite, crystalline zeolite, zirconium silicate and calcium silicate.

A light and a dark mark on the same polymer composition has also been reported. Using a TEA-$CO_2$ laser and a composition comprising polyethylene, 1% of a mica-based additive and 0.01% of a red pigment, a white mark was achieved by bleaching of the red pigment at a low energy density (<2.5 joules/cm$^2$) and a black mark was achieved by carbonization of the polyethylene and the additive at a higher energy density (>4 joules/cm$^2$).

Color marks have been formed on a dark background by a Nd:YAG laser or a frequency doubled Nd:YAG laser (wavelength 532 nm), employing a polyacetal copolymer resin or a polybutylene terephthalate resin combined with a mineral black pigment (bone charcoal, bone black or ivory black) that is removed or destroyed by the laser, and a heat-stable organic and/or inorganic pigment or a polymer-soluble dye. Color marks have also been achieved with a Nd:YAG laser on thermoplastics that have been colored by an organic dye or pigment and an inorganic pigment of the same color, and which also contain carbon black. These color marks have the same color as the background color of the plastic, but have a lighter tone.

Although color laser-markable polymer compositions, such as those employing polyamides, polybutylene terephthalate, and acetal copolymers (e.g., polyoxymethylene) and laser energy absorbing additives, are currently under development, the formulations are proprietary. It has been reported that, using these experimental formulations, black or white laser images have been formed on a blue polybutylene terephthalate and on a yellow acetal. Color-sensitive additives have also been incorporated into two different proprietary acetal formulations, such that when exposed to light from an Nd:YAG laser, the initial shades of the resins, dark hues of maroon, green, brown, and navy blue, become lighter (e.g., maroon to pinkish hue, navy blue to light blue) depending on the characteristics of the laser beam. A two-color mark has also been reported to be produced using a frequency-doubled Nd:YAG laser to form a green image on a proprietary yellow-pigmented polyamide.

Although a high contrast black, white or colored mark on polymer articles may be desirable in certain cases, there is a need for laser marking for wider applications, such as decorative multi-colored designs on plastic products, multi-colored company logos, and other distinctive multi-colored designs and logos that enhance a product's sales appeal. There is a further need for a process that provides multiple colored laser designs on a wide variety of different thermoplastics. Moreover, there is a need for a method of custom-designing the color of laser marks for each customer by preselection of the color hue(s) and for providing uniformity and reproducibility of the color of the marks from batch to batch. There is a further need for producing a plurality of different preselected specialty color markings on a single polymer article and incorporating computerized laser marking steps into the manufacturing process as the article moves down a production line.

SUMMARY OF THE INVENTION

The invention provides a novel material composition and method for obtaining both light and dark laser marks of varying shades and intensities on a single plastic article by selectively controlling laser energy parameters. Thus, by preselection of laser settings, preselected light or dark contrasting shades may be reproduced on similar plastic articles to produce multi-colored designs. The invention further provides a method for controlling laser parameters and polymer compositions to obtain laser marks of preselected color hues on a variety of different thermoplastics, with color tones and contrasts optimized by varying laser settings. Thus, the method provides for a range of preselected contrasting color tones to be developed on a plastic substrate to create multi-colored designs on a single plastic article. The invention further provides a method for obtaining identically colored laser marks on plastic articles having different background colors. Moreover, the invention provides a method for controlling laser parameters and providing polymer compositions comprising color pigments that irreversibly change color due to a change in chemical configuration when heated by laser energy, to provide laser marks having entirely different colors on a single plastic article.

The methods of the invention are inexpensive and efficient processes for custom design of light, dark and/or colored laser marks on plastics and are particularly suitable for providing multiple light and dark shades or color tones on a single polymer assembly, such as a computer keyboard, cellular phone, pager, and the like, by selectively changing and controlling the laser settings to provide different light, dark and/or colored markings as the assembly moves down a production line. Moreover, a method of the invention assures the uniformity and reproducibility of the color hues and shades of the laser marks from batch to batch within acceptable tolerance limits for color variance.

DETAILED DESCRIPTION OF THE INVENTION

In the methods of the invention, any pulsed laser that has readily adjustable variable parameters that govern laser energy characteristics, such as pulse content, pulse duration and pulse frequency, may be employed. Preferably, the laser has a wavelength in the near infrared (780 nm to 2000 nm), the visible range (380 nm to 780 nm), or the near ultraviolet range (150 nm to 380 nm). Suitable lasers include, but are not limited to, solid state pulsed lasers, pulsed metal vapor lasers, excimer lasers and continuous wave lasers with pulse modification, such as the commercially available Nd:YAG laser (wavelength 1064 nm), frequency-doubled Nd:YAG laser (wavelength 532 nm) and excimer laser (wavelength 193 nm–351 nm). The laser scanning velocity may range from about 150 to 350 mm/second and the pulse frequency from about 0.1 Hz to 10 kHz. Preferably, the pulse frequency is 1 to about 15 kHz for the Nd:YAG laser and 0.1 to about 200 Hz for the excimer laser. The amperage ranges preferably from 1 to about 20 amperes for the Nd:YAG laser. As disclosed herein, the invention employs a Nd:YAG laser having a variable lamp current (amperage) and a Q-switch for varying pulse frequencies.

In each of the methods of the invention described below, the provided laser has a principal wave length, a preselectable beam aperture and scanning velocity, and at least two variable laser parameters selectable from the group consisting essentially of an amperage from a range of amperages, a pulse frequency from a range of pulse frequencies, and a pulse duration from a range of pulse duration, wherein each individual selection of two or more of an amperage, a pulse frequency or a pulse duration comprises a laser setting that provides a laser beam having an individual laser energy characteristic.

In each of the methods of the invention, the plastic articles suitable for laser marking include any plastic articles that are molded, extruded or formed by any known conventional method. The plastic articles comprise resins, laser energy absorbing additives and coloring agents, as described below, and may further comprise other additives provided the additives do not interfere with the laser marking of the articles. Such other additives are known to those skilled in the art of polymer compounding and include, but are not limited to, reinforcing fillers, flame retardants, antioxidants, dispersants, impact modifiers, ultraviolet stabilizers, plasticizers, and the like.

In each of the methods of the invention, the laser energy absorbing additive is capable of absorbing light preferably in the near infrared range, the visible range, and/or the near ultraviolet range. Exemplary additives include, but are not limited to, carbon black, graphite, zirconium silicates, calcium silicates, zeolite, cordierite, mica, kaolin, talc, and the like. Any commercially available organic pigment, inorganic pigment, or polymer-compatible organic dye is suitable for use as a colorant. Exemplary organic pigments include, but are not limited to Barium red 1050® (Cook Son), Filamid yellow R®, Filamid red GR®, Heliogen green K8730®, Heliogen blue K 6911D®, LISA yellow 57Y®, LISA red 61R® (Bayer), and the like. Exemplary inorganic pigments include, but are not limited to, titanium dioxide, carbon black, ultramarine blue (Whittaker, Clark & Daniel), and the like, and other additives, such as china clay, kaolin, talc, and the like. Exemplary organic dyes suitable for use with the resins of the invention include, but are not limited to, Macrolex green G®, Macrolex orange 3G®, Macrolex violet 3R®, Macrolex yellow 3G®, Macrolex fluorescent yellow 10 GN® (Ciba-Geigy), Fluorescent yellow 3R®, Orange 3B® (Bayer), and the like. Exemplary colorants that are bleachable by laser energy include, but are not limited to, ultramarine blue, Cromophtal Red G® and Cromophtal Brown 5R® (Ciba Geigy).

Method and Composition to Obtain Both Light and Dark Laser Marks on a Plastic Article In one embodiment of the invention, both light and dark laser marks and various shades of the light and dark marks are produced on a single plastic material having a novel composition, by controlling laser energy parameters. Light marks are produced at certain selected laser settings by foaming of the resin and dark marks are produced at other selected laser settings by charring of at least the resin. There may also be a certain degree of charring of additives present in the composition. The lightest and darkest marks have a contrast rating of 10 against the colored plastic background by visual comparison on a scale of 1 to 10 where 10 is the highest contrast rating.

The composition of the article comprises three essential components: (i) a thermoplastic resin that foams when heated, (ii) a non-carbon black laser energy absorbing additive (i.e. not carbon black), and (iii) a coloring agent comprising one or more colorants selected from the group consisting essentially of an organic pigment, an inorganic pigment, a polymer-soluble dye, and mixtures thereof. Preferably, at least one of the colorants is bleachable by laser energy.

The laser energy absorbing additive is present in the composition in an amount sufficient to produce enough heat to (a) foam the resin at selected laser settings that produce a high peak power with a short pulse duration (e.g., 1–2 kHz, 10–14.5 amperes) and (b) to char at least the resin at selected laser settings that produce a lower peak power but a higher average power with a sustained pulse duration (e.g., 7–9 kHz, 11–12.5 amperes).

Preferably, the composition comprises about 50% to about 98% by weight of a polyolefin resin, such as polyethylene, HDPE, polypropylene, or mixtures or copolymers thereof, about 0.4% to about 0.7% by weight of the laser energy absorbing additive, and about 0.7% to about 1% by weight of a coloring agent. A preferred composition comprises 97.3% polyolefin resin, 0.7% of a mica-based energy absorbing additive, 1% of a coloring agent and 1% of a dispersant wax. Preferably, the laser energy absorbing additive comprises mica in flake, platelet or pearl form, having a particle size of less than 15 μm. Suitable mica-based additives for use with Nd:YAG lasers include Iriodin®/Lazer Flair® LS 820 and LS 825 (EM Industries). The manufacturer's literature for the LS 820 and LS 825 states that only dark laser marks (due to charring) are produced on, for example, polyethylene and polypropylene, when the additive has a concentration of 0.1% to 0.3% in the polymer composition. However, it was unexpectedly discovered, as described herein, that by using a higher concentration of, for example, the LS 820 (0.4 to 0.7%) and laser settings as described below, light marks are produced on polyethylene and polypropylene by foaming of the resin as well as the dark marks produced by charring of the resin.

In this embodiment of the invention, a first portion of the plastic article is irradiated with a first laser beam having a laser energy characteristic which causes at least the resin to foam. A second portion of the plastic article is irradiated with a second laser beam having a different energy characteristic which causes at least the resin to char. The degree of foaming or charring obtained is dependent on the laser energy characteristics. Thus, by varying the laser settings, not only are the lightest and darkest marks obtained, but gradations of different shades of light and dark marks are also obtained. Optionally, the method further comprises irradiating a third portion of the plastic article with a third laser beam having a laser energy characteristic sufficient to cause at least the resin to foam or to char to produce another laser mark having a different light shade or a different dark shade on the plastic article, and repeating the irradiating step with laser beams of differing energy characteristics to produce a plurality of different shades of light and dark laser marks on the plastic article.

Figure 1:
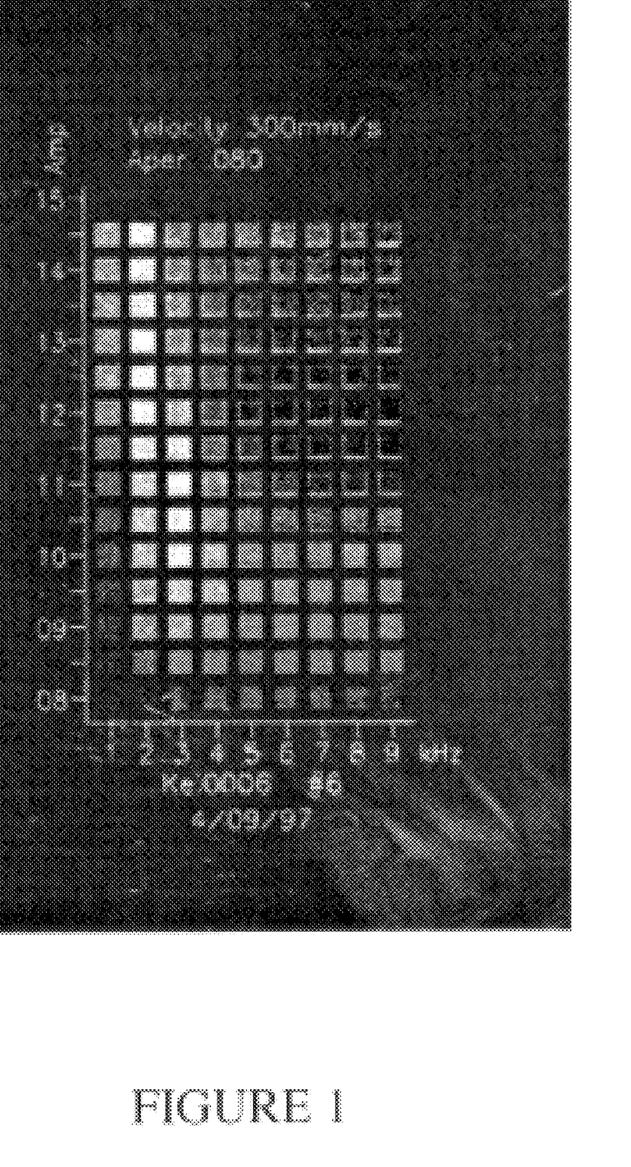
FIG. 1 is an image illustrating a grid of light and dark laser marks produced by different laser settings on a plastic article comprising HDPE, a mica-based laser energy absorbing additive, and an organic dye.

As illustrated in FIG. 1, light and dark laser marks and gradations of light and dark shades are produced on a single plastic molded article by selecting laser parameter settings to provide laser beams of varying energy characteristics. The illustrated article comprises 97.3% high density polyethylene, 0.7% Iriodin®/Lazer Flair® LS 820, 1% ultramarine blue, and 1% ethylene-bis-stearamide (dispersing agent). The laser markings on the illustrated grid are produced by a continuous wave Nd:YAG laser (wavelength 1064), with a Q-switch for pulse frequency modification, at a scanning velocity of 300 millimeters per second (mm/sec) and a beam aperture setting of 0.080. Each square in the grid is the product of a separate pass of the laser having the amperage (Amp) and Q-switch frequency settings (kHz) indicated on the x and y axes.

As illustrated in FIG. 1, at a low pulse frequency and high amperage (eg. 2 kHz, 14.5 amps) the laser produces a very high peak power that results in heat-induced foaming of the resin. As the pulse frequency increases, the individual power released with each pulse decreases but the number of pulses increases, such that a sustained average power is supplied that is sufficient to produce charring of at least the resin at high frequency and medium amperage (e.g. 8 kHz, 12 amps). The average power may be sufficient to cause some foaming of the resin but the effect is at least partially masked because of the charring. At low amperages (e.g. 8–8.5 amps), even at high frequencies (e.g. 9 kHz), the power produced does not generate a sufficient local temperature rise to cause significant foaming or charring of the resin. However, at least the colorant is discolored to produce individual variations of darkish shade that correspond to the respective frequencies and amperages employed.

At low pulse frequency and increasing amps (e.g. 2 kHz, 10–13 amps; 3 kHz, 9–12 amps) sufficient peak power is generated to increase the degree of foaming of the polymer and decompose the colorant producing progressively lighter shades that correspond to the respective frequencies and amperages employed. The lightest marks are produced at laser settings of 2 kHz, 12 amps and 3 kHz, 11 amps. At higher kHz and higher amps (e.g. 8 kHz, 11–12.5 amps; 9 kHz, 11–13.5 amps) the average power produced is sufficient to both decompose the colorant and char the polymer and/or additives, producing darker shades that correspond to the selected frequencies and amperages. Examples of optimum settings for the darkest marks illustrated are 6 kHz, 12 amps; 7 kHz, 11.5 amps; 8 kHz, 11.5 amps; 9 kHz, 12 amps.

Preselection of Light/Dark Markings for Multi-Colored Designs

By establishing a color shade grid, such as that illustrated in FIG. 1, a laser mark having a selected light or dark shade may be made on another plastic article of the same composition by selecting the laser setting (i.e. frequency and amperage) that produces the desired color shade. To produce a decorative design having two or more light and/or dark shades, two or more passes of the laser with the appropriate laser settings are employed. Known techniques for design production, such as masking, computer controlled laser design, and the like, may be used.

Figure 2:
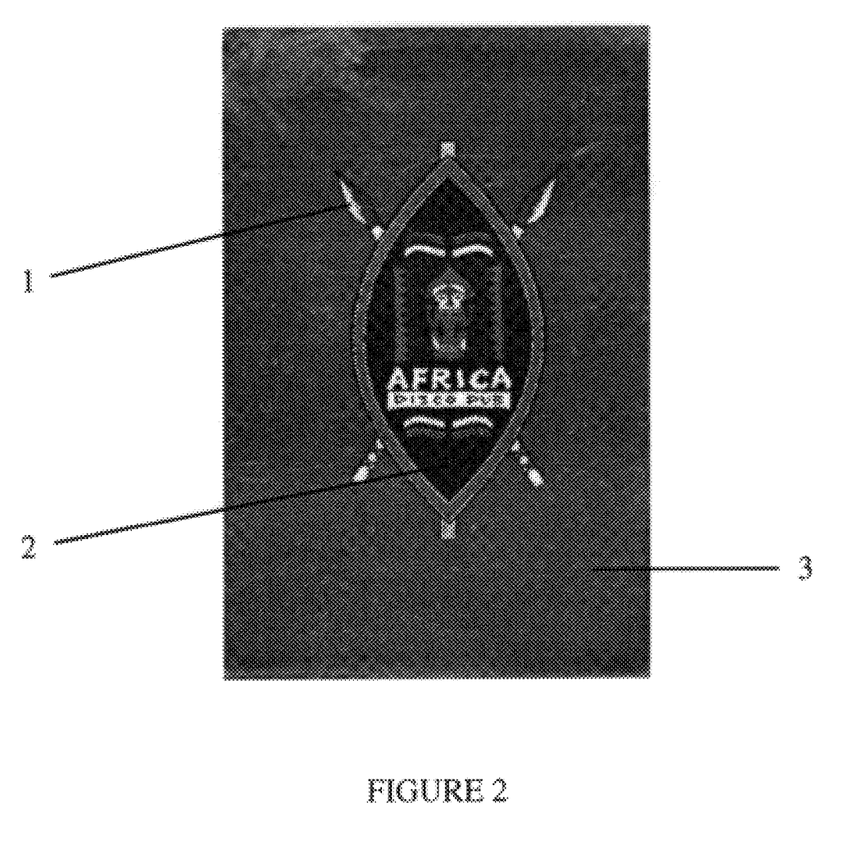
FIG. 2 is an image illustrating a multi-colored design produced on a plastic article having the same composition as that of FIG. 1, by selecting appropriate laser settings.
Figure 3:
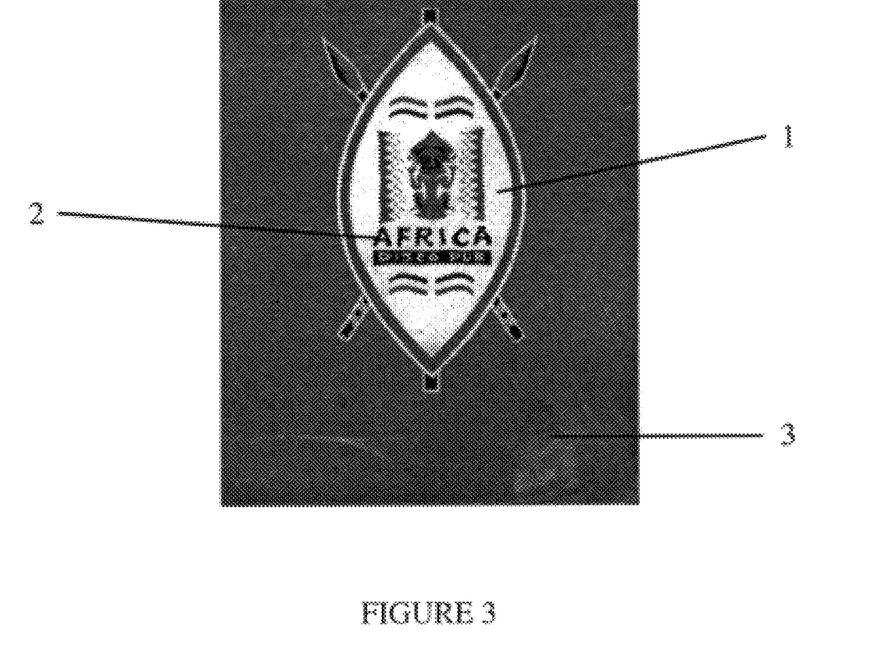
FIG. 3 is another image illustrating a multi-colored design produced on a plastic article having the same composition as that of FIG. 1, by selecting appropriate laser settings.

Examples of two-tone light/dark decorative designs achieved by the method of the invention are illustrated in FIGS. 2 and 3. In each of the examples, marking was accomplished on a plastic article having the same composition as the article of FIG. 1. Using the same or a similar Nd:YAG laser, a dark shade mark is achieved at a setting of 8 amps and 8 kHz, and a light shade mark is achieved at a setting of 12.5 amps and 2 kHz. The light markings 1 are of a silvery beige tone and the dark markings 2 are a brown tone, both shades being on the ultramarine blue background color 3 of the plastic piece, with an achieved overall effect that is aesthetically appealing.

Preselection of Colored Laser Marks for One-Color and Multi-Colored Designs

In another embodiment of the invention, a multi-colored laser image having preselected color tones of a color hue is obtained on a plastic article comprising a composition that displays the selected color tone upon irradiation with the laser having a preselected energy characteristic. The plastic article has a background color comprising a colorant or laser energy absorbing pigment, such as carbon black, that decomposes or becomes colorless when exposed to laser energy. The polymer composition comprises (i) a thermoplastic resin, (ii) a coloring agent comprising one or more colorants selected from the group consisting essentially of (a) an organic pigment, a polymer-soluble dye, and mixtures thereof, (b) an inorganic pigment, a polymer-soluble dye, and mixtures thereof, and (c) an organic pigment and an inorganic pigment having a different color, wherein at least one of the colorants is thermostable, and (iii) a laser energy absorbing additive. Preferably, the energy absorbing additive comprises carbon black, and the ratio of the coloring agent to the carbon black is about 10:1 to about 1:1. Preferably, the laser energy absorbing additive and/or any colorants that are not thermostable mask the color of the thermostable colorant in the composition prior to exposure to laser energy and decompose or vaporize when heated by laser energy to expose the color of the thermostable colorant.

By the method, a plurality of portions of the plastic article are irradiated with a plurality of laser beams, each having a different laser setting for a different energy characteristic, as described above, to obtain a plurality of laser marks on the article. Each of the laser marks has a different light or dark tone of the color of the thermostable colorant. A selection of at least two color tones from the plurality of color tones is made. Two or more portions of a second plastic article having the same composition as the first plastic article are then irradiated with the laser at preselected settings to provide selected energy characteristics for achieving the preselected color tones. A multi-colored laser image having preselected tones of the same color is thus produced on the plastic article.

Figure 4:
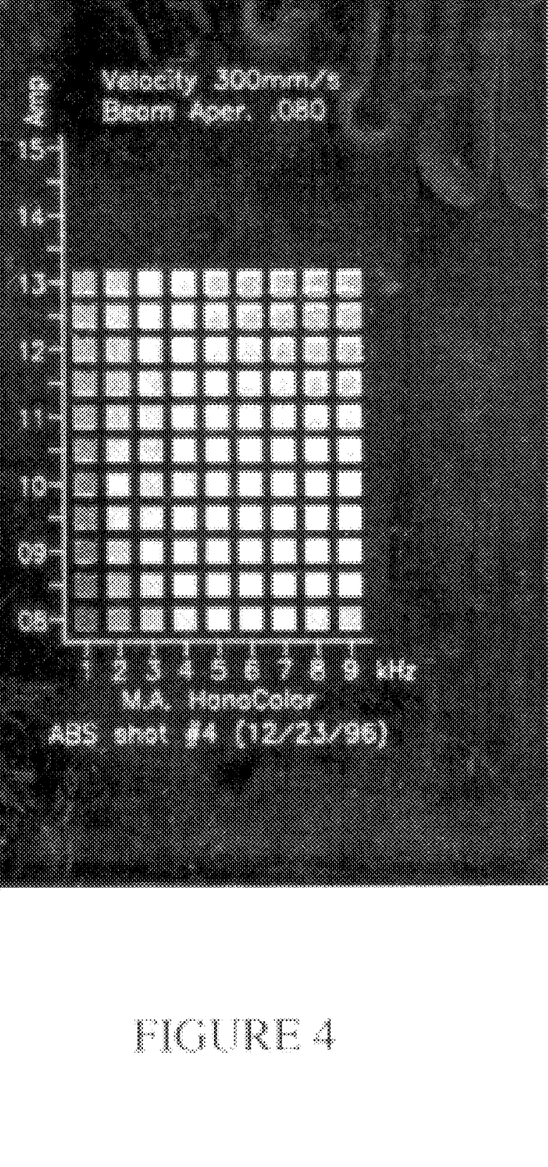
FIG. 4 is an image illustrating a grid of laser marks having different color tones of the same color, produced by different laser settings on a plastic article comprising ABS, carbon black, and a thermostable organic dye.

A grid showing light and dark tones of a color and gradations of light and dark tones of the color is illustrated in FIG. 4. The markings are produced by a Nd:YAG laser (wavelength 1064 nm), having a beam aperture of 0.080 and a scanning velocity of 300 mm/second. The illustrated polymer composition comprises 98.78% ABS (Bayer 266-1016®), 0.044% carbon black (Raven 1170®), 0.3% Macrolex orange 3G® (organic dye), and 0.88% ethylene-bis-stearamide (dispersant wax). The revealed color markings using the illustrated polymer composition are tones of gold. The brightest gold marks, having a contrast rating of 10, are obtained at a laser settings of 5 kHz, 9.5–10.5 amps; 6–7 kHz, 9–10 amps; and 8 kHz, 9 amps, where the carbon black is completely vaporized, revealing the thermally stable colorant. At lower frequencies, even at high amperages, (e.g., 1–5 kHz, 13 amperes) the carbon black is incompletely vaporized, producing darkish tones. At high frequencies and high amperages (e.g. 7–9 kHz, 11–13 amperes), the resin is carbonized, producing burnished gold tones. Thus, a multi-colored design of preselected color tones may be obtained on a plastic article of the same composition, by selecting the corresponding laser settings for irradiation. For example, a bright gold color is preselected at a laser setting of 5 kHz and 10.5 amperes. A second, burnished gold tone is preselected at a laser setting of 9 kHz and 11.5 amperes.

Any thermoplastic resin may be employed in this embodiment of the invention. If the resin is capable of foaming when heated, the tones of color are lighter at low frequencies and high amperages than those illustrated in FIG. 4. Suitable resins include, but are not limited to, any naturally occurring or synthetic polymer prepared by polymerization, polycondensation or polyaddition, such as polyesters, polyethylene, polypropylene, polyisobutylene, polystyrene, polyvinyl chloride, polyvinylidene chloride, polyvinyl acetals, polyacrylonitrile, polyacrylates, polymethacrylates, polybutadiene, ABS, ethylene vinyl acetate, polyamides, polyimides, polyoxymethylene, polysulfones, polyphenylene sulfide, polycarbonates, polyurethanes, polyethers, polyether sulfones, polyacetals, phenolics, polycarbonate, polyester carbonate, polyethylene terephthalate, polybutylene terephthalate, polyarylates, polyarylene sulfides, polyether ketones, and mixtures and copolymers thereof.

Examples of polymer compositions suitable for use in this embodiment of the invention are illustrated in Table 1. The contrast ratings are given for the brightest color marks on a visual scale of 1 to 10 with 10 being the highest contrast.

Laser Marks Having The Same Color On Polymer Compositions Having Different Background Colors In another embodiment of the invention, by controlling the laser settings, as described above, laser marks having the same color hue on two or more different plastic articles are obtained. The compositions of the articles may be the same except for the coloring agent employed. Alternatively, the compositions may differ with respect to the thermoplastic resin, laser energy absorbing additive and/or coloring agent employed. A color shade/tone grid may be established for each polymer composition, as described above. A laser mark having a preselected color hue is produced by irradiating the first plastic article at a preselected laser setting to obtain the selected color hue. A laser mark having the same selected color hue is produced by irradiating the second plastic article at a preselected laser setting appropriate to obtain the selected color hue. To determine whether the two laser marks are substantially identical in color, a measurement of color variance may be made, as discussed further below.

Multiple Differently Colored Laser Marks On A Single Plastic Article

In another embodiment of the method, multiple laser marks having different colors are obtained on a single plastic article by appropriate selections of laser settings. In this embodiment, an inorganic color pigment is employed that has an original color that chemically and irreversibly changes to a different color when exposed to a threshold temperature that is higher than the temperature required to vaporize or decolorize a masking pigment, such as carbon black. Typically, the chemical change in the color pigment is produced by decomposition (e.g., a heat-induced change in the crystalline structure of the pigment by the removal of the water of crystallization). Inorganic pigments that irreversibly change color at threshold temperatures are disclosed in U.S. Pat. No. 4,861,620, the disclosure of which pertaining to such pigments is hereby incorporated by reference. Exemplary of such pigments are cobalt compounds, such as cobalt oxalate, cobalt formate and cobalt phosphate, potassium cobalticnitride, copper compounds, such as copper oxalate, nickel compounds, such as nickel oxalate, lead compounds, bismuth oxalate, and a mixture of nickel oxalate and cobalt oxalate. The irreversible color changes are produced at threshold temperatures ranging from 50° C. to 450° C. For example, potassium cobalticnitride changes from an original color of blue tinted green to a light violet at 140° C.; copper oxalate changes from an original color of light green tinted blue to red tinted gray at 250° C.; cobalt oxalate changes from an original color of light pink to black at 290° C.; and a lead compound changes from an original color of white to orange at 360° C.

In this embodiment of the invention, the polymer composition comprises (i) a thermoplastic resin, (ii) the color pigment that is capable of undergoing the color change, (iii) a masking pigment, such as carbon black, and (iv) a non-carbon black laser energy absorbing additive, such as the mica described above.

To obtain the differently colored marks, laser settings are selected to produce at least two different energy characteristics, the first sufficient to decompose the masking pigment and reveal the original color of the color pigment, and the second sufficient both to decompose the masking pigment and to produce the color change in the color pigment. Thus, two laser marks of two different colors are produced on different portions of a single polymer article by selecting appropriate laser settings.

Comparison of Color Intensities of Laser Marks and Measurement of Color Variance In each of the methods of the invention, a comparison may be made between the color (or light/dark) intensity of the preselected laser mark obtained at a preselected laser setting and a standard color (or light/dark) intensity obtained at the same laser setting, such as that obtained on the grids described above. Such a comparison may also be made between the presumably identical colored laser marks made on different polymer compositions. Comparisons may also be made between laser mark color intensities from batch to batch, for quality control.

By the method, several measurements may be made of the color intensity of the laser mark. For example, reflectance curves for each laser mark are obtained by a spectrophotometer, such as the model SF600 plus Spectra Flash® (datacolor, international, Charlotte, N.C.). In addition, a chromaticity diagram for each mark is obtained, such as by the CIELAB system (datacolor, international), having color coordinates for a light/dark axis (L), green/red axis (a) and blue/yellow axis (b) to obtain L* a* b* coordinates. (CIE stands for the International Commission on Illumination). Similar measurements are commonly used by color compounders for providing a measure of color intensity of organic pigments, inorganic pigments, and dyes. A comparison of the values of the measurements between laser mark samples provides a value for ΔE which is a measure of the color variance between the samples. The smaller the ΔE, the closer the samples are in color. An allowable tolerance range for ΔE may then be established for various laser applications. For example, applications for the electronics industry may require a ΔE no higher than 0.4, whereas for the consumer packaging industry a reasonable ΔE may be 1 or less, and for the automotive industry a reasonable ΔE may be 0.3 to 0.5. Allowable tolerance ranges may be 0 to about 5.

If the ΔE falls outside of the allowable tolerance range, the polymer composition and/or the laser setting must be modified to obtain a value for ΔE that falls within the allowable tolerance range.

Automated Control of Laser Parameter Settings to Produce Laser Marks Having Different Color Intensities on One Or More Plastic Articles In An Assembly Line Process The methods of the invention are inexpensive, fast and efficient processes for custom design of light, dark and/or colored laser marks on most thermoplastic substrates and are particularly suitable for providing multiple specialty colors on a single polymer assembly, such as a computer keyboard, cellular phone, pager, and the like, by computerized control of laser parameter settings to provide different light, dark and/or colored markings on the keys as the assembly moves down a production line. For example, in the manufacture of a keyboard, the laser can be programmed obtain customized marks for letters, with specialty colors used to indicate symbols.

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

TABLE 1

| Composition | #1 | #2 | #3 |
|---|---|---|---|
| 488 ABS | 454* | 454 | 454 |
| Orange 3G | 2.27 | 2.27 | 1.82 |
| 1170 CB** | 0.41 | 0.35 | 0.40 |
| Wt % of 3G | 0.5 | 0.5 | 0.40 |
| 3G/CB Ratio | 5.54 | 6.49 | 4.44 |
| Contrast | 8.0 | 9.0 | 8.0 |
| Chip Color | black | black | black |
| Mark Color | gold | gold | gold |

| Composition | #4 | #5 |
|---|---|---|
| 488 ABS | 454 | 227 |
| Orange 3G | 1.46 | 0.50 |
| 1170 CB** | 0.41 | 0.14 |
| Wt % of 3G | 0.32 | 0.22 |
| 3G/CB Ratio | 3.57 | 3.57 |
| Contrast | 7.5 | 8.5 |
| Chip Color | black | black |
| Mark Color | gold | gold |

| Composition | #6 | #7 | #8 | #9 |
|---|---|---|---|---|
| 2658 PC | 227 | 227 | 227 | 227 |
| Orange 3G | 0.68 | 0.68 | 0.68 | 0.68 |
| 1170 CB | 0.091 | 0.105 | 0.124 | 0.100 |
| Wt % of 3G | 0.30 | 0.30 | 0.30 | 0.13 |
| 3G/CB Ratio | 7.5 | 6.5 | 5.5 | 3.0 |
| Contrast | 9.0 | 9.0 | 9.0 | 8.0 |
| Chip Color | black | black | black | black |
| Mark Color | gold | gold | gold | gold |

| Composition | #10 | #11 | #12 | #13 |
|---|---|---|---|---|
| 2658 PC | 227 | 227 | 227 | 227 |
| FL Yellow 3R† | 0.57 | 0.57 | 0.40 | 0.40 |

TABLE 1-continued

| | | | | |
|---|---|---|---|---|
| 1170 CB | 0.097 | 0.156 | 0.15 | 0.20 |
| Wt % of 3R | 0.25 | 0.25 | 0.18 | 0.18 |
| 3R/CB Ratio | 5.9 | 3.65 | 2.67 | 2.0 |
| Contrast | 9.0 | 8.0 | 7.0 | 5.0 |
| Chip Color | dark green | dark green | dark green | dark green |
| Mark Color | bright yellow | bright yellow | bright yellow | bright yellow |

| Composition | #14 | #15 |
|---|---|---|
| 2658 PC | 227 | 227 |
| Macro Yellow 3G | 0.40 | 0.40 |
| 1170 CB | 0.10 | 0.20 |
| Wt% of 3G | 0.18 | 0.18 |
| 3G/CB Ratio | 4.0 | 2.0 |
| Contrast | 8.0 | 5.0 |
| Chip Color | black | black |
| Mark Color | bright yellow | bright yellow |

| Composition | #16 | #17 | #18 | #19 |
|---|---|---|---|---|
| 6323 PPRO | 454 | 227 | 227 | 227 |
| 1170 CB | 0.2 | 0.10 | 0.10 | 0.10 |
| Talc | 2.27 | 2.27 | 0 | 0 |
| 295 China Clay | 0 | 0 | 2.27 | 0 |
| Kaolin SP 170 | 0 | 0 | 0 | 2.27 |
| Contrast | 10.0 | 10.0 | 10.0 | 10.0 |
| Chip Color | black | black | black | black |
| Mark Color | white | white | white | white |

| Composition (% by weight) | #20 | #21 | #22 |
|---|---|---|---|
| ABS Bayer 266–1016 | 98.78% | 98.78% | 98.78% |
| 1170 CB | 0.044% | 0.044% | 0.044% |
| A280 Wax‡ | 0.88% | 0.88% | 0.88% |
| Macrolex Green G | 0.3% | 0 | 0 |
| Macrolex Violet 3R | 0 | 0.3% | 0 |
| Fluorescent Yellow 3R | 0 | 0 | 0.3% |
| Contrast | 10.0 | 10.0 | 10.0 |
| Chip Color | black | black | black |
| Mark Color | bright green | violet | bright yellow |

*grams;
**carbon black;
†fluorescent yellow 3R;
‡ethylene-bis-stearamide.

We claim:

1. A laser-marked molded, extruded or formed plastic article having a composition comprising (a) a thermoplastic resin that foams when heated; (b) a laser energy absorbing additive, and (c) a coloring agent comprising one or more colorants selected from the group consisting of an organic pigmnent, an inorganic pigment, a polymer-soluble dye, and mixtures thereof,
   the article comprising at least one light-shade laser mark produced by foaming of the resin at a first selected laser setting, and at least one dark-shade laser mark produced by carbonizing of the resin at a second laser setting.

2. The article of claim 1, wherein the article comprises 0.7% to 1% by weight of the coloring agent.

3. The article of claim 1, wherein each laser setting comprises an individual laser energy characteristic resulting from an individual selection of two or more of an amperage from a range of amperages, a pulse frequency from a range of pulse frequencies or a pulse duration from a range of pulse durations.

4. The article of claim 1, wherein the laser energy absorbing additive comprises about 0.4% to about 0.7% by weight of a mica-based laser energy absorbing additive.

5. The article of claim 1, wherein the resin is selected from the group consisting of polyethylene, high density polyethylene, polypropylene, and mixtures and copolymers thereof.

6. The article of claim 4, wherein the energy absorbing additive comprises a mica in flake, platelet or pearl form, having a particle size of less than 15 μm.

* * * * *